June 26, 1962  A. BAUMANN ET AL  3,040,912
CONVEYOR SYSTEM WITH STATION SELECTOR
Filed Dec. 4, 1959  6 Sheets-Sheet 1

FIG. I

Albert Baumann
Erwin Grube
INVENTORS.

BY
AGENT.

FIG. 2

Albert Baumann
Erwin Grube
INVENTORS.

June 26, 1962  A. BAUMANN ET AL  3,040,912
CONVEYOR SYSTEM WITH STATION SELECTOR
Filed Dec. 4, 1959  6 Sheets-Sheet 3

Albert Baumann
Erwin Grube
INVENTORS.

BY Karl F. Ross
AGENT.

June 26, 1962 A. BAUMANN ET AL 3,040,912
CONVEYOR SYSTEM WITH STATION SELECTOR
Filed Dec. 4, 1959 6 Sheets-Sheet 4

FIG.5

Albert Baumann
Erwin Grube
*INVENTORS.*

BY

*AGENT.*

Albert Baumann
Erwin Grube
*INVENTORS.*

United States Patent Office 3,040,912
Patented June 26, 1962

3,040,912
CONVEYOR SYSTEM WITH STATION SELECTOR
Albert Baumann, Bielefeld, and Erwin Grube, Bielefeld-Ubbedissen, Germany, assignors to Durkoppwerke Aktiengesellschaft, Bielefeld, Germany, a corporation of Germany
Filed Dec. 4, 1959, Ser. No. 857,353
Claims priority, application Germany Dec. 6, 1958
13 Claims. (Cl. 214—11)

Our present invention relates to a distributor system in which a plurality of load carriers, entrained by a common conveyor, are provided with selector means which can be preset to indicate any one of several work stations served by the conveyor, the station so indicated being equipped with a correspondingly adjusted controller co-operating with the selector means of the carrier to activate a release mechanism for discharging a load from the carrier onto the station.

In a system designed to accommodate a large number of work stations it is desirable, from the viewpoint of accessibility and for most economical utilization of carrier space, to provide each carrier with a plurality of selector elements disposed in a predominantly longitudinal array, these elements occupying one or more rows (preferably two) extending in the direction of advance of the carrier. If each row contains ten selector elements, it will be possible to establish one-hundred separate station designations with the aid of a decimal code which can be conveniently registered and read by operating and supervisory personnel.

In one particular system of this type, disclosed in copending application Ser. No. 857,402 filed by us on even date herewith, the controller bears a test pattern whose elements correspond in number and relative positioning to the selector elements of the carrier, this test pattern being mounted on a swingable support which, at a predetermined instant in the travel of the carrier past the work station, is moved toward the carrier in order to ascertain the presence or the absence of a matching relationship between the preset selector elements (one from each row) and the characteristic adjustment of a like number of test elements in the controller. If such matching relationship is found to exist, a release mechanism is actuated by mechanical or electromagnetic means to inactivate a detent on the carrier, thereby enabling a discharge of its load onto a stationary receiving surface extending alongside the conveyor path. If, however, a load is already present on that receiving surface at this particular work station, the release mechanism is blocked and the carrier continues on its way with the load undisturbed.

The need for moving a test-pattern support toward a carrier at a precise moment of alignment, as it occurs in the above system, requires great exactitude in the machining of the parts and maintenance of the conveyor speed within rather narrow limits as determined by the inertia of the movable elements. It is, therefore, an object of our present invention to provide an improved system of this general type which obviates the necessity for bodily moving a test-pattern support toward and away from a carrier in a predetermined cycle.

It is also an object of this invention to provide improved, positive-acting means for blocking the operation of the release mechanism in the presence of another load on the receiving surface.

A further object of our invention is to provide, in a system as outlined above, a controller adapted to be conveniently reset from a remote location, thus in a manner which will not interfere with the operation of the conveyor, whereby (e.g. at a special sorting station) rapid changeovers from one code designation to another are possible so that carriers bearing different designations may be selectively caused to discharge their respective loads.

A feature of the present invention resides in the provision, in a controller designed to co-operate with a selector whose code elements are arrayed in $n$ different rows, of $n+1$ test elements of which one is positioned in the path of a special marker on the carrier whereas the remaining ones are respectively aligned with the end rows of selector elements. Thus, in the preferred case of a selector having two rows of digital elements arrayed according to a decimal code, the controller has three test elements relatively offset in a direction transverse to the path of the carrier. The relative spacing of these test elements in longitudinal direction, i.e. in the direction of carrier movement, corresponds to the spacing of the code elements from one another and from the marker in a matching selector setting. As each test element registers with its counterpart on the carrier, it performs a preparatory operation for the actuation of the associated release mechanism. If all $n+1$ test elements operate simultaneously in this manner, the release mechanism is actuated to cause the discharge of the load, at least if the blocking device responsive to the presence of another load on the receiving surface is not operative.

Advantageously, the test elements of the controller and the code and marker elements of the selector are adapted to enter into camming engagement with one another whereby the test elements are displaced into an off-normal position upon the passage of the carrier. In such position, from which the test elements are returned to normal by suitable restoring means immediately after the corresponding code or marker element has passed, a test element may act upon an associated latch member to disengage it from a preferably spring-biased release member which, upon being simultaneously disengaged by all the latch members, trips the detent means on the carrier to bring about the discharge of the load. Movement of the release member into tripping position may, furthermore, be prevented by blocking means operating independently of the latch members under the control of a load-responsive actuator on the receiving surface.

In a preferred embodiment, the test elements of the controller are rollers individually journaled on movable supports which are connected, integrally or otherwise, with the respective latch members referred to above. In the case of a work station having a given digital code, the controller will ordinarily require only one initial adjustment and may, for this purpose, comprise $n$ displaceable rollers and one fixed roller, the displaceable rollers being adapted to be selectively indexed at various longitudinal distances from the fixed roller in accordance with the numerical designation of the station; the indexing may be effected by the spaces of a swingable rack which forms the movable support connected with the associated latch member. In the case of a sorting station, where rapid changeovers are desired for the purpose of taking out of circulation various loads from carriers bearing different station designations, the total number of rollers in the controller may be $nm+1$, $m$ being the number of selector elements per row (usually ten), the $nm$ rollers corresponding to the $nm$ test elements being axially displaceable on their shafts, between an inoperative and an operative position, by suitable transmission means such as Bowden wires controlled from a stationary selector; in this case the $m$ shafts of the rollers associated with a row of selector elements may be secured to a common latch-actuating support.

The above and other objects, features and advantages of our present invention will become more fully apparent from the following detailed description of a preferred embodiment, reference being had to the accompanying drawing in which.

Figure 1:
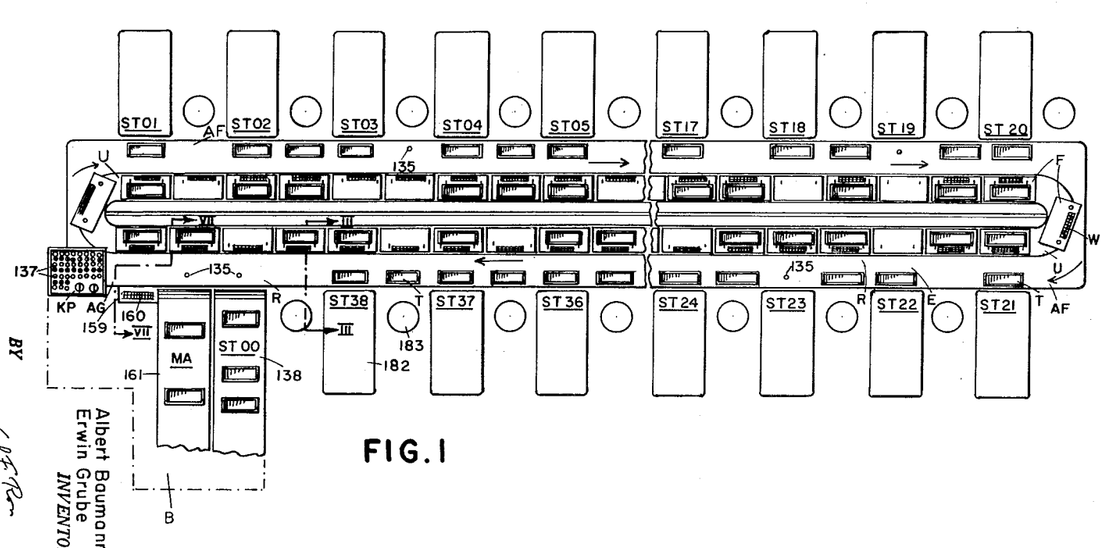
FIG. 1 is a top-plan view of a distributor system according to the invention.

The distributor system shown generally in FIG. 1 comprises a conveyor U which may be an endless chain, e.g. as illustrated in our aforementioned application, and has not been illustrated in detail. The conveyor is driven counterclockwise, by a suitable source of power not shown, and passes in ascending order a number of work stations designated ST01 through ST38, a receiving station ST00 for goods returned from the work stations, and a sorting station MA. As will be understood from the ensuing description, the system could readily be expanded to include up to ninety-nine work stations in addition to the receiving station. At AG there is shown a dispatching area for reloading the conveyor; the loads T may be containers for unfinished or semifinished goods which are to be successively processed at various work stations before being taken out of circulation at station ST00 or MA. Stations ST00 and MA as well as area AG form part of a command post B which also includes a control panel KP manned by a supervisor.

Figure 2:
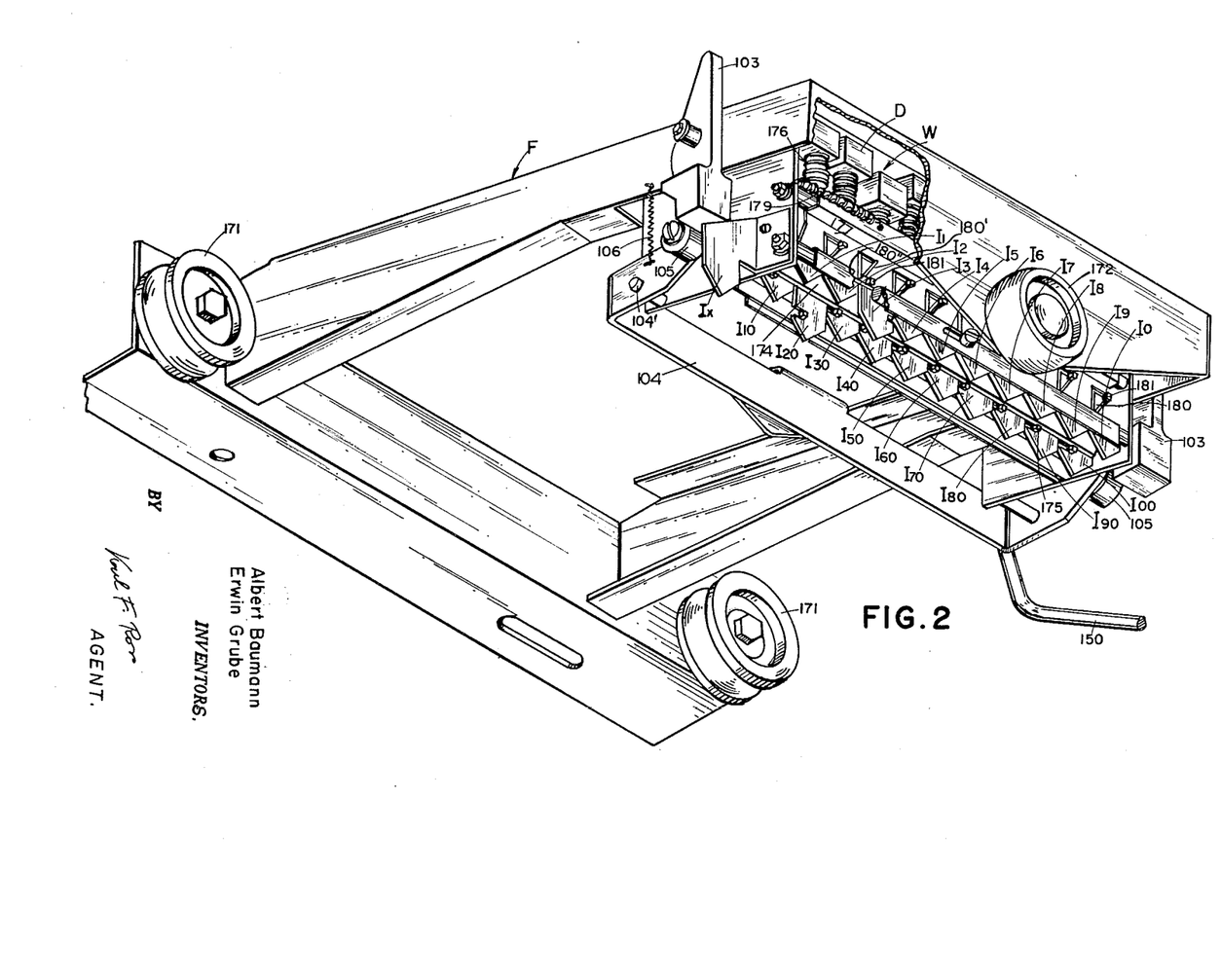
FIG. 2 is a perspective bottom view of a carrier provided with a station selector generally similar to that disclosed in our co-pending application Ser. No. 857,402 referred to above.
Figure 3:
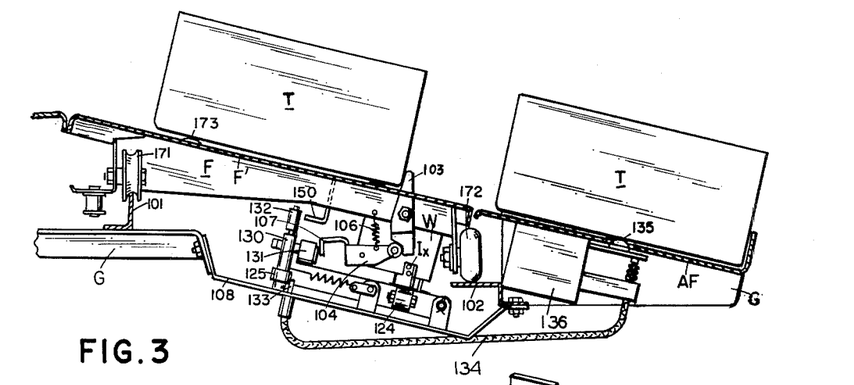
FIG. 3 is a sectional elevation taken on line III—III of FIG. 1, showing the carrier of FIG. 2 positioned above a work-station controller embodying the principles of this invention.
Figure 7:
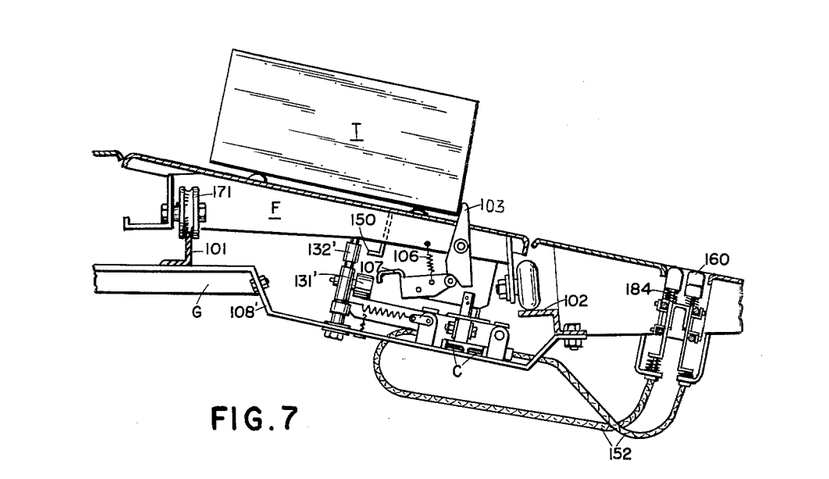
FIG. 7 is a sectional elevation similar to FIG. 3, taken on the line VII—VII of FIG. 1 to illustrate further details of the inspection station.

A shelf AF, common to all the stations, extends completely around the conveyor path. The sloping surface of this shelf is divided at each work station into a receiving section E and a reloading section R. The length of each of these sections in the direction of conveyor movement corresponds to that of a carrier F whose load-supporting surface F' is co-planar with that of shelf AF, as best seen in FIGS. 3 and 7, this shelf being supported by the base G of the machine. Rails 101 and 102, secured to base G, are respectively engaged by a pair of rollers 171 and a single roller 172 on each carrier F. A pair of detent levers 103, whose weighted lower extremities tend to keep them in an erected position, are pivotally secured to the frame of the carrier F and project upwardly above its surface F' through slots long enough to permit a retraction of their projecting ends by rotation in either direction. These levers are freely swingable in a counter-clockwise sense (as viewed in FIGS. 2 and 3) in order to permit a load to be pushed past them from shelf AF onto bearing surface F' but are normally latched against clockwise rotation by a bail 104 which is pivoted to the carrier frame at 104'. Rollers 173 on the carrier F facilitate the movement of the load T over its sloping surface F'.

Each carrier F is provided with an individual selector W whose construction corresponds to that described and illustrated in our co-pending application. It comprises twenty pushbuttons D arrayed in two parallel rows, these pushbuttons having rigidly depending therefrom respective slides which have been designated $I_1$ to $I_0$ for the units row and $I_{10}$ to $I_{00}$ for the tens row. While these slides are structurally identical with the selector elements termed daggers in the co-pending application, they exercise in the present instance a camming function and do not, as in the companion case, probe for openings in a test pattern. Each pushbutton D bears at the top a legend (not shown) corresponding to the subscript of its respective camming slide.

The two rows of camming slides $I_1$ to $I_0$ and $I_{10}$ to $I_{00}$ are disposed on opposite sides of a fixed channel member 174, of inverted-U section, whose flanges serve as abutments against which lugs 175 on the slides are normally urged from below by restoring springs 176. Two lock-out bars 177, of which only the one co-operating with the units slides $I_1$ to $I_0$ is visible in FIG. 2, are horizontally slidable on supporting rods 178 and are urged toward the left by springs 179. Each bar 177 is formed with ten windows 180 which are penetrated by further lugs 181 on the associated slides and form generally triangular projections 180' whose lower horizontal edges 180", as particularly illustrated for the slide $I_3$, are engageable by the lugs 181 when the slides are depressed. Actuation of any pushbutton D in either row will cause its lug 181 to cam the lock-out bar 177 to the right, thereby releasing any slide previously lowered in the same row and preventing the retention of more than one button per row in its depressed position. The selector W illustrated in FIG. 2 will be seen to register the digital code "23," its slides $I_3$ and $I_{20}$ having been depressed; it is to be understood that each code consists of two digits, including the "00" digit for the first nine stations ST01 through ST09 and the "0" digit for the decadic stations ST10, ST20 etc.

The bail 104, which is urged in a counterclockwise sense (as viewed in FIGS. 2, 3 and 7) about its pivots 104' by a spring 106, carries an operating cam 107 which is lifted by the controller AE (FIG. 4) of a work station whose setting corresponds to that of the selector W. The carrier F further comprises, as part of its selector, a stationary camming lug $I_X$ at its leading edge and a controller-restoring arm 150 at its trailing edge.

Figure 4:
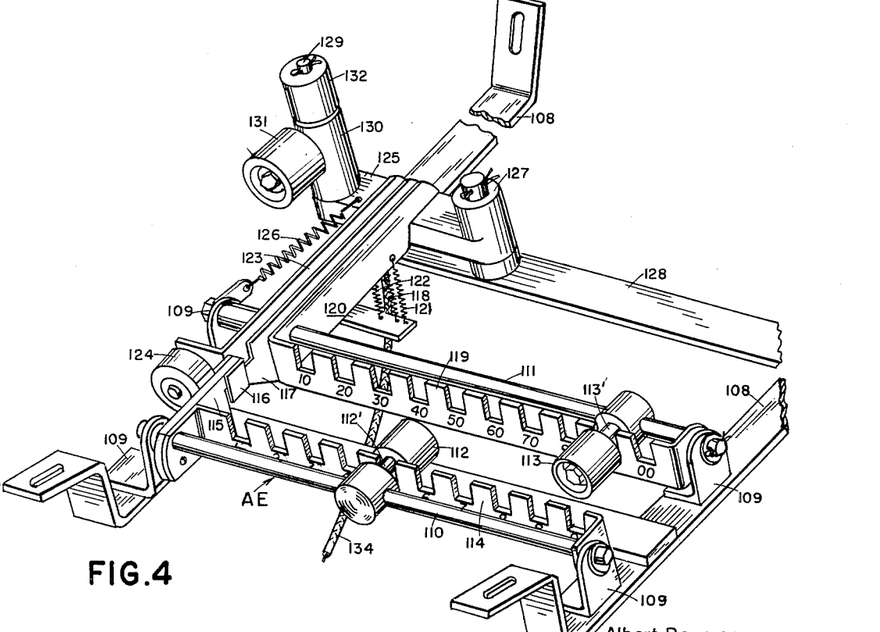
FIG. 4 is a perspective top view of a controller as shown in FIG. 3.

A controller AE, as shown in FIG. 4, is provided at each of the work stations ST01 to ST38 and the unloading station ST00. It is supported by two beams 108, carried by the base G, on which there are mounted by means of brackets 109 two parallel rods 110, 111 serving as pivotal axes for the shafts 112', 113' of a pair of cam rollers 112, 113. Also pivoted on these rods are two crenellated indexing bars or racks 114 and 119, respectively, whose indentations are selectively engageable by the respective roller shafts 112', 113'. Each of rollers 112 and 113, when tilted upwardly and out of engagement with its associated indexing bar, can be slid along its rod 110 or 111 into ten longitudinally spaced positions each aligned with a respective indentation. With the particular adjustment shown in FIG. 4, the settings of units roller 112 and tens roller 113 represent the code number "95"; it will be seen that this number does not correspond to that of any station actually provided in the system of FIG. 1 but is merely illustrative of one of one-hundred different adjustments possible.

The indexing bar 114 is rigid with a short lever 115 bearing a fork 116 which acts upon an extremity of a latch arm 117 swingable about rod 111. Another latch arm 120 is integral with indexing bar 119 and extends parallel to arm 117. A third such arm 123, parallel to the other two, is also swingable about rod 111 and carries a further cam roller 124 which is transversely offset from both the units roller 112 and the tens roller 113. More particularly, roller 124 lies in the path of the camming lug $I_X$ of the selector W whereas rollers 112 and 113 are respectively aligned with the units slides $I_1$ to $I_0$ and the tens slides $I_{10}$ to $I_{00}$ of the selector.

The three latch arms 117, 120 and 123, respectively controlled by units roller 112, tens roller 113 and reference roller 124, have aligned extremities undercut to bear upon a release arm 125 under tension from respective springs 118, 121 and 122. Arm 125 is urged counterclockwise about its pivot 127, which rises from a bridge 128 spanning the beams 108, but is normally prevented from so moving by the latch arms 117, 120 and 123. Release arm 125 fixedly supports a boss 130 on which a horizontal roller 131 and a vertical roller 132 are rotatably journaled, the shaft of roller 132 having been indicated at 129. When all three latch arms are lifted simultaneously off the release arm 125, an action which will occur only upon the concurrent depression of all three cam rollers 112, 113 and 124 by respective camming elements (lug $I_X$ and, in this case, slides $I_5$ and $I_{90}$) of the selector, arm 125 is swung by spring 126 into a position in which roller 131 lies in the path of the bail lifter 107 so that, as the carrier F passes above the controller AE, its bail 104 is rotated clockwise (e.g. as viewed in FIG. 3) to release the detent levers 103 and to permit a downward sliding of the load T onto the shelf AF. Since, however, the slides $I_3$, $I_{20}$ actually depressed in the selector W of FIG. 2 do not occupy the same position relative to lug $I_X$ as do the rollers 112, 113 of the controller AE with respect to roller 124, the selector would not be capable of initiating the release of the associated detent levers by the concurrent displacement of the three test rollers 112, 113, 124 of the controller.

After the controller AE of a station has tested the camming elements of a matchingly adjusted selector and its latch arms have been actuated thereby to liberate the release arm 125, this action having been followed by the disengagement of the detent levers 103 by the bail 104, the arm 150 associated with this selector bears glancingly upon the roller 132 to restore the arm 125 to its normal position illustrated in FIG. 4. In this position the arm is immediately re-engaged by the latch members 117, 120 and 123 whose associated rollers have meanwhile passed from under the cooperating camming elements of the selector.

Figure 5:
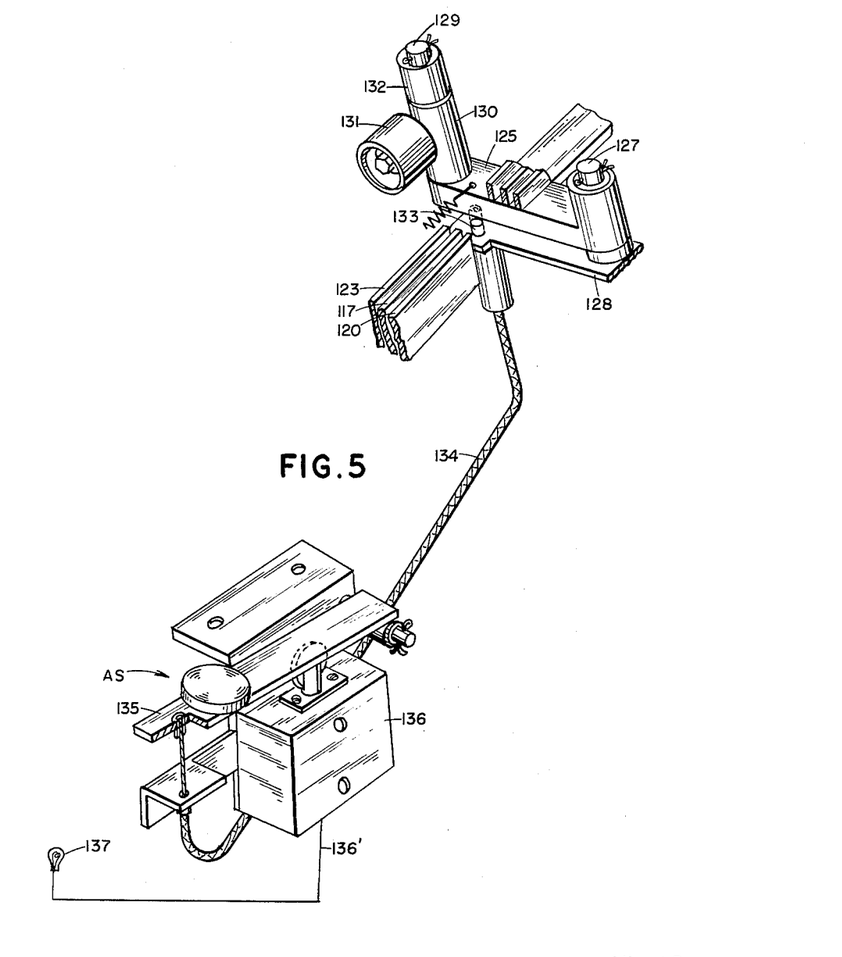
FIG. 5 is a perspective top view of a blocking mechanism associated with the controller of FIGS. 3 and 4.

As seen in FIG. 5, the bridge 128 is penetrated by a stop pin 133 which is normally below the level of arm 125 and is therefore cleared by this arm when the latter is swung about its pivot 127 under the conditions previously described. The pin 133 may, however, be raised into an elevated position (shown in dot-dash lines) in which it blocks the movement of arm 125, this displacement being brought about by a key 135 which is present on the receiving surface E of the associated station and is connected with pin 133 through a suitable transmission element such as a Bowden wire 134. Key 135 is adapted to be depressed whenever a load T alights on its receiving surface E, thereby preventing actuation of the controller AE to discharge another load onto the same surface. Key 135 also co-operates with a switch 136 to energize, via a wire 136', a corresponding indicator lamp 137 on panel KP.

It will thus be seen that the supervisor at post B will always determine at a glance which work station is processing a load and which is idle. This enables a rational distribution of the work so as to avoid overly frequent bypassing of a station by a load destined therefor.

As will be seen from FIG. 1 each station ST01 to ST38 is equipped with a work table 182 and a stool 183 respectively facing the receiving section E and the reloading section R of shelf AF. At stations ST00 and MA, however, these work tables are advantageously replaced by outgoing conveyors 138, 161 adapted to remove the oncoming loads as fast as they are discharged from the main conveyor U.

Figure 6:
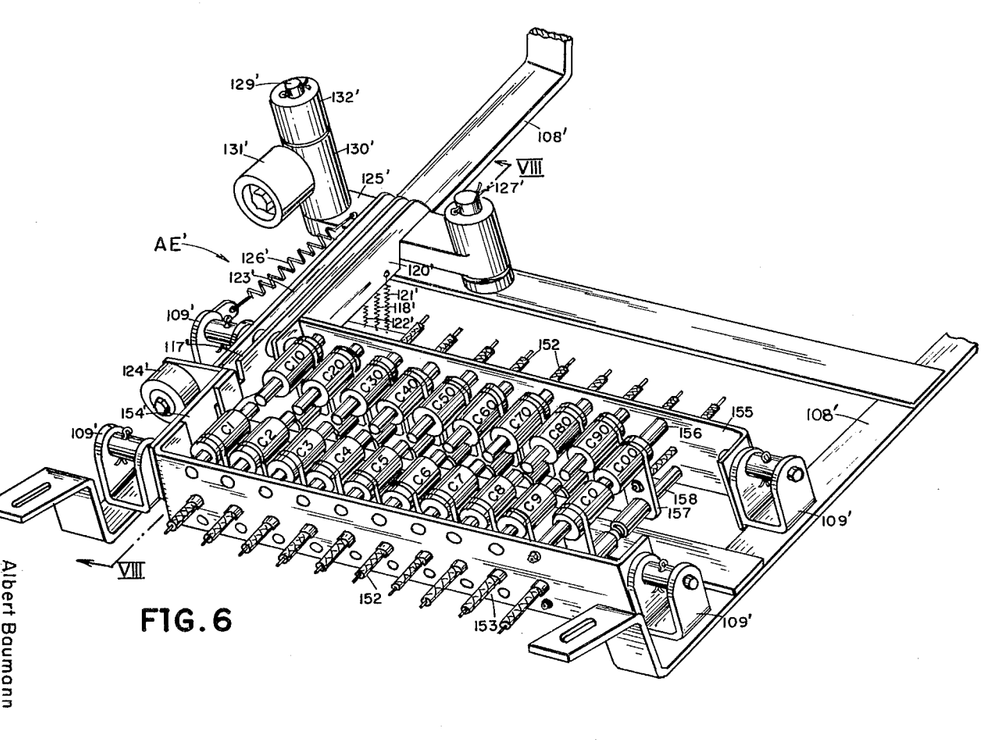
FIG. 6 is a perspective view similar to FIG. 4, showing a sorting-station controller according to the invention.

Sorting station MA may be used to inspect the loads destined for a particular station, to check the operation of any carrier-borne selector and/or to withdraw from circulation any load intended for a temporarily overloaded station. To this end the station MA is provided with a modified controller AE' whose construction has been illustrated in FIGS. 6–8. This controller comprises, in lieu of the two longitudinally displaceable test rollers 112 and 113 of FIG. 4, two banks of axially slidable rollers C1 through C0 and C10 through C00 whose shafts 156 are fixedly positioned in a pair of swingable bars 153 and 155. Bar 153, journaled like bar 155 in brackets 109' carried by beams 108', is rigid with a short lever 154' which engages an extremity of latch arm 117'; latch arm 120' is integral with bar 155. The third latch arm 123' bears reference roller 124'. The three latch arms 117', 120' and 123', biased by respective springs 118', 121' and 122', act in the same manner as their unprimed counterparts in FIG. 4 to prevent the rotation of release arm 125' about its pivot 127' under the action of spring 126'; arm 125' carries boss 130' with horizontal roller 131' and vertical roller 132', the latter being rotatable about stud 129'.

Figure 8:
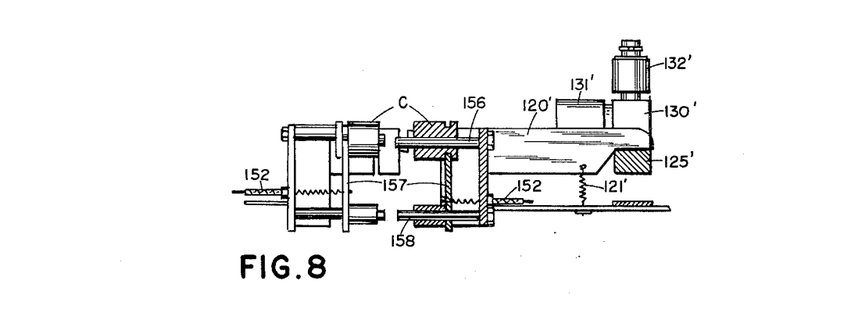
FIG. 8 is a sectional elevation taken on line VIII—VIII of FIG. 6.

The ten units rollers C1 to C0 and the ten tens rollers C10 to C00, generally designated C in FIGS. 7 and 8, are normally in a withdrawn position adjacent their respective supporting bars 153 and 155. In these withdrawn positions they are out of the path of camming slides $I_1$ to $I_0$ and $I_{10}$ to $I_{00}$ of any selector W. A stationary selector 159, controlled by the supervisor, has twenty pushbuttons 160 whereby any two-digit combination can be registered with the aid of these rollers by the inward displacement of one units roller and one tens roller on its respective shaft. Such displacement, particularly illustrated in FIG. 6 for the rollers C0 and C00, can be brought about by means of forks 157 which slide on rods 158 extending parallel to the roller shafts 156 from bars 153 and 155. The inward displacement of the forks 157 under the control of pushbuttons 160 may be brought about, against the force of springs 182, by means of Bowden wires 152.

The units and tens rollers thus displaced are in the path of the camming slides of selectors W whereby, in the manner previously outlined, the load on any carrier bearing a correspondingly adjusted selector will be discharged. It will be understood that the pushbuttons 160 may be provided with suitable lock-out means, e.g. an arrangement similar to that described in connection with buttons D of FIG. 2, to prevent the actuation of more than one pair of buttons at a time.

Our invention is, of course, not limited to the specific embodiment described and illustrated but may be modified in various ways without departing from the spirit and scope of the appended claims.

What is claimed is:

1. In a distributing system, in combination, a conveyor, a load carrier entrained by said conveyor, a plurality of load-receiving stations each provided with a controller in the path of said carrier, selector means on said carrier including a plurality of individually displaceable code elements arrayed in at least one row extending in the direction of carrier movement, a fixed reference element on said carrier transversely offset from said row, said controller comprising at least two test elements spaced apart in the direction of carrier movement and positioned adjacent the path of said selector means in alignment with said row and said reference element, respectively, for camming displacement by the latter and by any code element of said row displaced into an off-normal position, detent means on said carrier adapted to hold a load thereon, release means at said controller engageable with said detent means during passage of said carrier for tripping said detent means into a load-releasing position, and operating means for said release means jointly controlled by said test elements for actuation upon simultaneous camming displacement of said two test elements, said release means comprising a cam member positioned adjacent the carrier path, said carrier being provided with cam-follower means coupled with said detent means and displaceable by said cam member in an operative position of the latter during passage of said carrier, said cam member being provided with biasing means urging it into said operative position and with a pair of independent latch members normally retaining said cam member in an inoperative position, said operating means comprising a pair of links each connected with a respective test element and with a respective latch member for disengaging the latter from said cam member upon camming displacement of the associated test element.

2. In a distributing system, in combination, a conveyor, a load carrier entrained by said conveyor, a plurality of load-receiving stations each provided with a controller in the path of said carrier, selector means on said carrier including a plurality of individually displaceable code elements arrayed in a plurality of rows extending in the direction of carrier movement, a fixed reference element on said carrier transversely offset from said rows, said controller comprising at least three test elements spaced apart in the direction of carrier movement and positioned adjacent the path of said selector means in alignment with said rows and said reference element, respectively, for camming displacement by the latter and by any code element of said rows displaced into an off-normal position, detent means on said carrier adapted to hold a load thereon, release means at said controller engageable with said detent means during passage of said carrier for tripping said detent means into a load-releasing position, and operating means for said release means jointly controlled by said test elements for actuation upon simultaneous camming displacement of said three test elements, said release means comprising a cam member positioned adjacent the carrier path, said carrier being provided with cam-follower means coupled with said detent means and displaceable by said cam member in an operative position of the lattter during passage of said carrier, said cam member being provided with biasing means urging it into said operative position and with three independent latch members normally retaining said cam member in an inoperative position, said operating means comprising three links each connected with a respective test element and with a respective latch member for disengaging the latter from said cam member upon camming displacement of the associated test element.

3. The combination according to claim 2 wherein said test elements are rollers, said code elements comprising substantially vertically displaceable sliders formed with lower camming edges and pushbuttons for depressing said sliders, said pushbuttons bearing numerical designations according to a decimal system.

4. The combination according to claim 2 wherein two of said links comprise elongated bars extending parallel to each other in the direction of carrier movement, said bars being swingable about axes also extending in said direction.

5. The combination according to claim 4 wherein said bars are provided with longitudinally spaced indentations corresponding in number to the code elements in the respective row, at least two of said test elements being rollers having shafts slidable and pivotable about said axes and receivable in said indentations.

6. The combination according to claim 4 wherein the number of said test elements equals that of said reference and code elements combined, all but one of said test elements being rollers provided with shafts respectively attached to said bars in positions corresponding to those of said code elements in the respective rows, said rollers being axially slidable on said shafts between a position of alignment and a position of disalignment with the corresponding row of code elements.

7. The combination according to claim 6 wherein said test elements are rollers respectively journaled on said links.

8. The combination according to claim 7 wherein the roller co-operating with said code element is resettably carried on one of said links with freedom of adjustment in the direction of carrier movement.

9. The combination according to claim 6 wherein said carrier is provided with restoring means adapted to engage said cam member in its operative position for returning it to engagement with said latch members subsequently to the actuation of said cam-follower means.

10. The combination according to claim 6 wherein each of said stations is provided with a receiving surface for a load released from said carrier, further comprising retractable stop means at said controller for maintaining said cam member in its inoperative position, independently of the position of said latch members, and control means for said stop means at said receiving surface, said control means being responsive to the presence of a load on said surface for blocking the operation of said cam member.

11. In a distributing system, in combination, a conveyor, a load carrier entrained by said conveyor, a plurality of load-receiving stations each provided with a controller in the path of said carrier, selector means on said carrier including a plurality of individually displaceable code elements arrayed in at least one row extending in the direction of carrier movement, a fixed reference element on said carrier transversely offset from said row, said contoller comprising at least two test elements spaced apart in the direction of carrier movement and positioned adjacent the path of said selector means in alignment with said row and said reference element, respectively for camming displacement by the latter and by any code element of said row displaced into an off-normal position, detent means on said carrier adapted to hold a load thereon, release means at said controller engageable with said detent means during passage of said carrier for tripping said detent means into a load-releasing position, and operating means for said release means mechanically linked to said test elements for joint actuation thereby upon simultaneous camming displacement of said two test elements, said release means comprising a cam member positioned adjacent the carrier path, said carrier being provided with cam-follower means coupled with said detent means and displaceable by said cam member in an operative position of the latter during passage of said carrier, said cam member being provided with biasing means urging it into said operative position and with a pair of independent latch members normally retaining said cam member in an inoperative position, said operating means comprising a pair of links each connected with a respective test element and with a respective member for disengaging the latter from said cam member upon camming displacement of the associated test element.

12. In a distributing system, in combination, a conveyor, a load carrier entrained by said conveyor, a plurality of load-receiving stations each provided with a controller in the path of said carrier, selector means on said carrier including a plurality of individually displaceable code elements arrayed in a plurality of rows extending in the direction of carrier movement, a fixed reference element on said carrier transversely offset from said rows, said controller comprising at least three test elements spaced apart in the direction of carrier movement and positioned adjacent the path of said selector means in alignment with said rows and said reference element, respectively, for camming displacement by the latter and by any code element of said rows displaced into an off-normal position, detent means on said carrier adapted to hold a load thereon, release means at said controller engageable with said detent means during passage of said carrier for tripping said detent means into a load-releasing position, and operating means for said release means mechanically linked with said test elements for joint actuation thereby upon simultaneous camming displacement of said three test elements.

13. In a distributing system, in combination, a conveyor, a load carrier entrained by said conveyor, a plurality of load-receiving stations each provided with a controller in the path of said carrier, selector means on said carrier including a plurality of individually displaceable code elements arrayed in a plurality of rows extending in the direction of carrier movement, a fixed reference element on said carrier transversely offset from said rows, said controller comprising at least three rollers spaced apart in the direction of carrier movement and positioned adjacent the path of said selector means in alignment with said rows and said reference element, respectively, for camming displacement by the latter and by any code element of said rows displaced into an off-normal position, detent means on said carrier adapted to hold a load thereon, release means at said controller engageable with said detent means during passage of said carrier for tripping said detent means into a load-releasing position, and operating means for said release means jointly controlled by said rollers for actuation upon simultaneous camming displacement of said three rollers, said code elements comprising substantially vertically displaceable sliders formed with lower camming edges and push buttons for depressing said sliders, said push buttons bearing numerical designations according to a decimal system.

References Cited in the file of this patent

UNITED STATES PATENTS 2,919,790   Winz ------------------ Jan. 5, 1960